(12) United States Patent
Becker et al.

(10) Patent No.: US 11,747,191 B2
(45) Date of Patent: Sep. 5, 2023

(54) AUTOMATED HEALTH STATE CLASSIFIER FOR ROTATING MACHINES BASED ON EXPERT KNOWLEDGE

(71) Applicant: Siemens Aktiengesellschaft, Munich (DE)

(72) Inventors: Tobias Becker, Fürth (DE); Jonas Deichmann, Cologne (DE); Eugen Graz, Erlangen (DE); Henning Ochsenfeld, Nuremberg (DE); Thorsten Reimann, Erlangen (DE); Jürgen Zettner, Veitsbronn (DE)

(73) Assignee: Siemens Aktiengesellschaft, Munich (DE)

( * ) Notice: Subject to any disclaimer, the term of this patent is extended or adjusted under 35 U.S.C. 154(b) by 70 days.

(21) Appl. No.: 17/426,386

(22) PCT Filed: Feb. 17, 2020

(86) PCT No.: PCT/EP2020/054002
§ 371 (c)(1),
(2) Date: Jul. 28, 2021

(87) PCT Pub. No.: WO2020/182412
PCT Pub. Date: Sep. 17, 2020

(65) Prior Publication Data
US 2022/0178737 A1    Jun. 9, 2022

(30) Foreign Application Priority Data
Mar. 14, 2019  (EP) ..................... 19162895

(51) Int. Cl.
*G01H 1/00* (2006.01)
*G01M 13/028* (2019.01)
*G06N 3/045* (2023.01)

(52) U.S. Cl.
CPC .......... *G01H 1/003* (2013.01); *G01M 13/028* (2013.01); *G06N 3/045* (2023.01)

(58) Field of Classification Search
CPC .... G01H 1/003; G01M 13/028; G06N 3/0454
(Continued)

(56) References Cited

U.S. PATENT DOCUMENTS 5,992,910 A * 11/1999 Kwon ........................ B66C 1/66
294/215
6,301,572 B1 * 10/2001 Harrison ................ G01H 1/003
702/54
(Continued)

FOREIGN PATENT DOCUMENTS

CN            107560849 A        1/2018

OTHER PUBLICATIONS

European Search Report for European Application No. 19162895.7-1001 dated Sep. 18, 2019.
(Continued)

*Primary Examiner* — Aditya S Bhat
(74) *Attorney, Agent, or Firm* — Lempia Summerfield Katz LLC

(57) ABSTRACT

The present disclosure relates to a computer-implemented method of, a data processing system for, and a computer program product for indicating machine failures as well as to a corresponding machine and a computer-implemented method of training a neural network for indicating machine failures. At least one input signal based on at least one physical quantity of at least one machine part is transformed into at least one feature. A neural network predicts a class and/or a severity of at least one machine failure based on the at least one feature.

19 Claims, 3 Drawing Sheets

(58) Field of Classification Search
USPC .......................................................... 702/34
See application file for complete search history.

(56) References Cited

U.S. PATENT DOCUMENTS 11,422,024 B2 * 8/2022 Abboud ................. G01H 1/003
2017/0315516 A1 * 11/2017 Kozionov ............. G06F 17/142

OTHER PUBLICATIONS

International Search Report and the Written Opinion for International Patent Application PCT/EP2020/054002 dated May 29, 2020.

* cited by examiner

4  Input signals
20 Rotating machine
21 Motor

S1 Temperature sensor
S2 Vibration sensor
S3 Velocity sensor
S4 Torque sensor

AUTOMATED HEALTH STATE CLASSIFIER FOR ROTATING MACHINES BASED ON EXPERT KNOWLEDGE

The present patent document is a § 371 nationalization of PCT Application Serial No. PCT/EP2020/054002, filed Feb. 17, 2020, designating the United States, which is hereby incorporated by reference, and this patent document also claims the benefit of European Patent Application No. 19162895.7, filed Mar. 14, 2019, which is also hereby incorporated by reference.

TECHNICAL FIELD

The present disclosure relates to a computer-implemented method of indicating machine failures, a data processing system for indicating machine failures, and a computer program product for indicating machine failures, as well as to a corresponding machine and a computer-implemented method of training a neural network for indicating machine failures.

BACKGROUND

Machine failures, in particular rotating machine failures (e.g., within bearings), by misalignment or imbalance of rotating parts, may lead to unplanned downtimes for maintenance or rather repair work. In order to detect possible machine failures before a severe machine failure occurs, experts regularly examine the state or functioning of parts of the (e.g., rotating) machine (e.g., motor, drive shaft, etc.) by measuring physical quantities related to the state/functioning of the respective parts like vibrations, rotational speed, torque, etc.

From the measured physical quantities certain values for assessing the state/functioning of the respective parts are derived (e.g., envelope spectrum, harmonic peaks, sidebands, etc.). Harmonic peaks and sidebands from the possible damage frequencies of the respective parts are indicators for specific failures and their severity. Due to a very high amount of connected rotating machines, (e.g., in production lines of manufacturing plants or due to a multitude of Internet of Things (IoT) devices), the condition of this large amount of (e.g., rotating) machines poses a big challenge.

Experts are indicating specific failures, for example of motors, manually or semi-automatically by analyzing the spectrum of a vibration signal of the monitored part (e.g., motor) of the (rotating) machine. The condition of a single (rotating) machine may be recorded periodically, and thereby historical data may be collected. Values and trends of simple Key Performance Indicators (KPI) like Root Mean Square (RMS) or crest factor may be used to determine the failure type, severity, and estimated progress. Due to very different loads in real applications, the KPIs may be misleading as intensities are seemingly higher but the root cause for this is not a progress in damage but due to load or ambient conditions. Many known automatic algorithms are giving indication of a specific failure by analyzing simple KPIs. These methods are mostly not very accurate, and they cannot indicate a specific type of failure.

U.S. Patent Application Publication No. 2017/0315516 discloses an apparatus for monitoring of a device including a moveable part, especially a rotating device. The apparatus includes a control module which receives a measured vibration signal of the device provided by a sensor connected to the device, provides a spectrum of the measured vibration signal, and pre-processes the spectrum to determine base frequencies and side frequencies. The base frequencies are frequencies having peak powers corresponding to eigen frequencies of the device or faulty frequencies and the side frequencies correspond to other frequencies. The control module additionally processes the base and side frequencies by applying separately a one-class classification on the base and side frequencies, combines the results of the one-class classifications to obtain a classification signal representing a confidence level, and outputs a decision support signal based on the classification signal, where the decision support signal indicates an error status of the monitored device.

Chinese Patent Application No. 107560849 relates to a kind of Wind turbines Method for Bearing Fault Diagnosis of multichannel depth convolutional neural networks. The method includes using the dither acceleration signal of drive end and anti-drive end under the vibration acceleration sensor simultaneously various states of collecting test bearing. The method further includes obtaining a corresponding time-frequency spectrum using the collected vibration signal application time-frequency analysis technology. Additionally, a depth convolutional neural networks diagnostic model is established, using time-frequency spectrum and bearing state as training sample, training diagnosis model. The method further includes evaluating the diagnostic model and applying the model to a bearing to be monitored. The method may realize that automated characterization learns, avoid Feature Engineering, effectively utilize multi-channel Vibration Signal, and have good versatility and augmentability.

U.S. Pat. No. 6,301,572 discloses a system and a method for tracking long term performance of a vibrating body Such as a gas turbine. The system includes a vibration Sensor who time domain outputs are transformed to the frequency domain, using a fast Fourier transform processing. Frequency domain outputs are provided as inputs to a fuzzy adaptive resonance theory neural network. Outputs from the network may be coupled to an expert System for analysis, to display devices for presentation to an operator, or are available for other control and information purposes.

SUMMARY AND DESCRIPTION

It is therefore an objective to provide a reliable automatic indication of specific (rotating) machine failures.

The present disclosure provides a computer-implemented method of indicating machine failures as well as a data processing system for and a computer program product for indicating machine failures, further a corresponding machine and a computer-implemented method of training a neural network for indicating machine failures.

The scope of the present disclosure is defined solely by the appended claims and is not affected to any degree by the statements within this summary. The present embodiments may obviate one or more of the drawbacks or limitations in the related art.

According to a first aspect, a computer-implemented method of indicating machine failures, in particular rotating machine failures, includes receiving at least one input signal based on at least one physical quantity of at least one machine part of a machine, in particular of a rotating machine, monitored by at least one sensor. The method further includes transforming (e.g., feature engineering) the at least one input signal into at least one feature. The at least one feature has a different domain and additionally or alternatively a different reference value than the at least one input signal. The method further includes predicting a class (e.g., failure type) and additionally or alternatively a severity of at least one machine failure, in particular of at least one rotating machine failure, based on the at least one feature by a neural network. The neural network is trained on specific patterns of the at least one feature or combinations of patterns of more than one feature indicative of specific machine failures, in particular specific rotating machine failures.

According to a second aspect, a data processing system for indicating machine failures, in particular rotating machine failures, includes devices and/or systems for carrying out the acts of the method of the first aspect.

According to a third aspect, a computer program product for indicating machine failures, in particular rotating machine failures, includes instructions which, when the program is executed by a computer, cause the computer to carry out the acts of the method according to the first aspect.

According to a fourth aspect, a (e.g., rotating) machine includes at least one machine part and at least one sensor. The sensor generates at least one input signal by monitoring at least one physical quantity of the at least one machine part. The at least one input signal is provided to the data processing system according to the second aspect.

A machine like a generator, a combustion engine, a milling machine, an engine lathe, an industrial robot, etc. has at least one moving machine part. The moving machine part may be any kind of machine part like a joint, a hub, a drive shaft, etc., moving relative to other parts of the machine. During operation of the machine, the moving machine part may deviate from an optimal operation state. Such deviation may be caused by a damage to the moving part, a change in the load, an error in controlling the machine, and the like. Such deviation from the normal operation state of the machine part may lead to a machine failure which may finally end in severe damage to the machine.

In the receiving of the at least one input signal, at least one physical quantity like vibrations, temperature, force, torque, rotational/angular/linear speed/acceleration, and/or the like of the machine part is monitored. Therefore, at least one appropriate sensor is provided, such as a temperature sensor, a vibration sensor, an acceleration sensor, a position sensor, a force sensor, etc. at the respective (e.g., rotating) machine.

More than one physical quantity may be monitored with appropriate sensors, for example, vibrations of the machine part may be monitored with a vibration sensor attached to the machine part. A temperature of or inside a machine part (e.g., a temperature of an oil bath of a rotating machine part) may be monitored with a temperature sensor. A rotational speed may be monitored with a rotation sensor. An acceleration (or force or speed derived from the acceleration) may be monitored with an acceleration sensor. The respective sensor generates an input signal based on the respective monitored physical quantity and the input signal is provided to and received by the data processing system.

In the transforming of the at least one input signal, the at least one input signal is transformed into at least one feature. For example, the input signal may be normalized and additionally or alternatively KPIs like RMS, crest factor, and/or standard deviation may be derived as features of the input signal. Further the input signal may (additionally) be transformed into another domain. For example, a vibration signal may be transformed from the time domain (F(t)) into the frequency domain (F(f)), (e.g., by a Fast Fourier Transformation (FFT)), or an acceleration signal may be transformed from the time domain (F(t)) into the 3D-domain (F(x,y,z)). Further, the input signal may be transformed such that the feature has a different reference value than the input signal, like a temperature signal may be transformed from degree Celsius (° C.) into Kelvin (K) or a speed signal of a machine part may be the signal of a relative speed which has to be transformed (e.g., superimposed with the speed of a related part of the machine) into an absolute speed (e.g., rotating element moved by an arm of the machine). Further, statistical values may be determined in the act of transforming. For example, in transforming the input signal may first be transformed into another domain and then statistical features may be derived therefrom. These transformations may be referred to as feature engineering The at least one "engineered" feature is provided to the neural network in the predicting of the class and/or the severity of the at least one machine failure. The neural network has been trained such that the neural network may predict based on the provided at least one feature the class (e.g., failure type like grinding bearing, etc.) and additionally or alternatively the severity (e.g., at least the states "good", "medium", "severe") of at least one machine failure. Specific machine failures (e.g., grinding bearing, micro fractures, leakage, short circuit, etc.) manifest themselves in specific patterns of the at least one feature or combinations of patterns of more than one feature. Therefore, the neural network has been trained based on the patterns of sets of training features indicative of at least one certain class and/or severity of machine failure.

The objective is inter alia to use (e.g., deep) neural networks with abstracted input parameters, e.g., the at least one feature that is similar to features which experts are using to identify the characteristics (e.g., class and severity) of the machine failure.

The class and/or severity of a machine failure predicted by the neural network may be reported to a user (e.g., technician, mechanic personnel, shift supervisor, facility engineer, etc.) who may initiate the necessary acts for avoiding the machine failure or worsening of a present machine failure. In other words, an output of the neural network gives the user easy to understand values about the state of the machine or rather of its machine parts ("what kind of failure and how strong the failure"). Alternatively, the method may include a further act of automatically initiating appropriate counter measures, like repositioning of movable parts of the machine, refilling of coolant or lubricant etc.

With the automatic notification of machine failures, the downtime due to service or maintenance may be reduced. Further, sever damage to machines may be avoided, as machine failures are early predicted by the neural network.

According to a refinement, the at least one monitored physical quantity is a vibration of the at least one machine part and the at least one generated input signal is a vibration signal.

According to a further refinement, the at least one sensor is a vibration sensor generating a vibration signal by monitoring a vibration of the at least one machine part.

The vibrations, e.g., of a continuously moving machine such as a rotating machine, are indicative of a plurality of (e.g., rotating) machine failures. Thus, by monitoring the vibrations of the (e.g., rotating) machine alone or by monitoring additionally further physical quantities like rotational speed, torque, or load, at least a part of the plurality of (e.g., rotating) machine failures may be predicted based on the pattern of the features into which the vibration signal and, in some examples, the further signals of the further physical quantities are transformed.

The vibrations enable identification of many (e.g., rotating) machine failures with little monitoring and computational effort.

According to a refinement, the at least one machine part is a motor.

Motors like a diesel motor of a generator, an electrical motor of a robot, etc. are rotating machine parts that have a constant state during operation. For example, generated vibrations, the rotational speed, and the torque of the motor during normal/optimal operation are rather constant. If the motor is in a state that is not normal/optimal during operation, the generated vibrations will deviate from the vibrations in the normal/optimal operational state and the rotational speed and torque may be different to normal or discontinuous/not steady.

Thus, with motors rotating machine failures may be indicated especially efficiently.

According to a refinement, the input signal is transformed into a spectrum of the input signal and, in some embodiments, additionally into stochastic features or into stochastic moments and/or into energies for predominant parts of the spectrum.

The spectrum for example of vibrations (e.g., for a predefined time span) is unique for certain machine failures. Thus, the spectrum of the input signal is very indicative for certain machine failures. If the information contained in the spectrum of the input signal is further supplemented with stochastic moments and/or energies for predominant parts of the spectrum like for example stochastic moments and/or energies for bands around the harmonic frequencies of a vibration signal, a more precise discrimination of classes and the severity of machine failures may be accomplished. Further, from the transformed spectrums or the input signals the statistical features may be derived, like RMS, significance, variance, etc.

With the transformation of the input signal into a spectrum thereof and additionally into stochastic moments and/or into energies for predominant parts of the spectrum the preciseness of the indication of machine failures may be significantly increased.

According to a refinement, the neural network is a deep neural network.

A deep neural network includes more than one layer, more than four layers, more than seven layers, or ten or more layers. Each layer may include several neurons or nodes. Each layer may contain ten or more neurons, 50 or more neurons, or 100 or more neurons.

The certainty of the predicted class and/or severity of the (e.g., rotating) machine failure are increased with a deep neural network.

According to a refinement, the neural network is deployed in a cloud system or on a local computer infrastructure of a premise where the machine is located.

Only the neural network or the whole data processing system, including the part of the data processing system responsible for receiving and transforming the at least one input signal, may be deployed in the cloud system.

With the (e.g., deep) neural network deployed in a cloud system, indicating of machine failures may be accomplished for several machines located in different sites, whereby the infrastructure for indicating machine failures may be shared (e.g., by different companies). If the neural network is deployed on the local computer infrastructure of a premise (e.g., of one company) indicating machine failures may be accomplished quicker and more often for the (e.g., rotating) machine(s) on the premise (e.g., of one company).

According to a refinement, the computer-implemented method further includes storing the at least one feature and, e.g., additionally the class (e.g., failure type) and/or the severity of respective machine failures of the at least one machine part over time as historical data of the at least one machine part.

The method may further include deriving a remaining lifetime of the at least one machine part based on the historical data of the at least one machine part.

The history (e.g., historical data of machine failures) of a machine part is stored. Based on this history (e.g., classes/severities of machine failures over time) or information derived therefrom, like incidence of machine failures, the remaining lifetime of the respective machine part may be predicted. Further, an audit trail for the respective machine part may be generated based on the history.

The downtime of production lines/manufacturing plants may be minimized based on the derived remaining lifetime of the at least one machine part, because the replacement of the respective machine part may be scheduled and organized well before it fails.

According to a fifth aspect, a computer-implemented method of training a neural network for indicating machine failures, in particular rotating machine failures, according to the first aspect, includes generating at least one set of at least one training feature. The at least one training feature is derived from at least one training input signal of a machine, in particular of a rotating machine. Specific patterns of the at least one training feature or combinations of patterns of more than one training feature are indicative of specific machine failures, in particular of specific rotating machine failures. The at least one training input signal is labelled with known classes and known severities of respective machine failures.

The method further includes training the neural network using the at least one set of the at least one training feature.

The training input signals correspond to the input signals and the training features correspond to the features used in the method of indicating machine failures according to the first aspect. The neural network used for predicting the machine failures of the at least one machine part needs to learn cues in patterns of provided features. Therefore, the set of the training feature(s) contains features of training input signals generated during a certain machine failure of the respective machine part (or of a comparable machine part). The set of the training feature(s) is labelled with the respective machine failure(s), in particular with the class and/or the severity of the machine failure, of the machine part present while the corresponding training input signal was generated (by the respective sensor(s)).

According to a refinement, the input signal is a real input signal from a real machine, a simulated signal from an artificial model of the machine, or a combination thereof.

A simulated training database hereby is constructed such that a baseband spectral signature in noise and for the characteristic features is generated, whereby the features of true machine failures are detectable (e.g., and labelled) in the training dataset, the failures severity is separable into a multitude of damage levels (e.g., at least good/medium/severe) and the features are generated with a high statistical variation to cover a variety of applications and machines. Further, the neural network (model) has the potential to become highly generalizable with a proportionally small amount of training data.

According to a refinement, the neural network is a pre-trained neural network.

By training a pre-trained neural network that has been conditioned for deriving information from industrial data, the time, and amount of sets of training feature(s) may be significantly reduced.

BRIEF DESCRIPTION OF THE DRAWINGS

The present disclosure and its technical field are subsequently explained in further detail by exemplary embodiments shown in the drawings. The exemplary embodiments only conduce better understanding of the present disclosure and in no case are to be construed as limiting for the scope of the present disclosure. Particularly, it is possible to extract aspects of the subject-matter described in the figures and to combine it with other components and findings of the present description or figures, if not explicitly described differently. Equal reference signs refer to the same objects, such that explanations from other figures may be supplementarily used.

DETAILED DESCRIPTION

Figure 1:
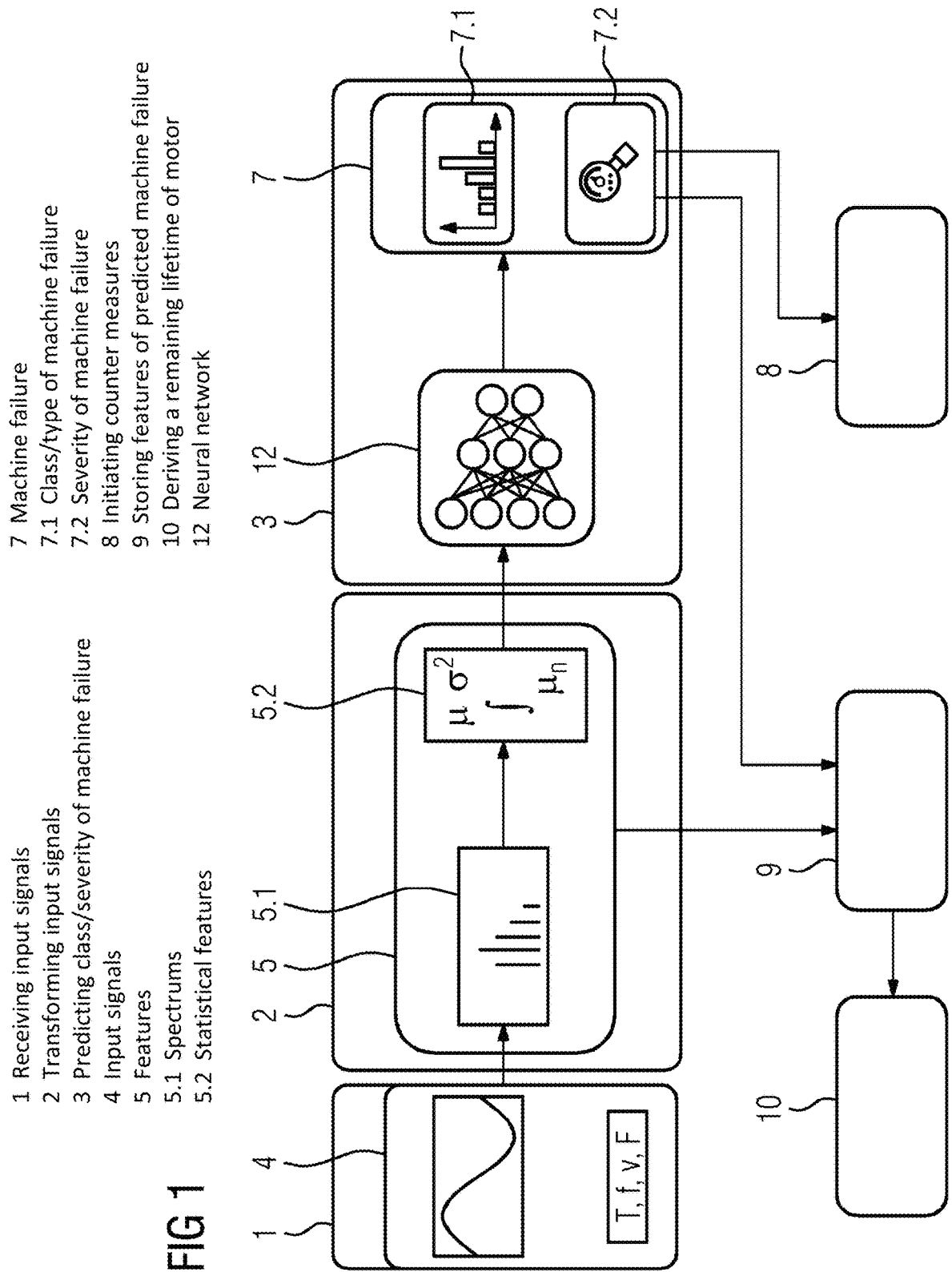
FIG. 1 depicts a schematic flow-chart of the computer-implemented method of indicating machine failures according to an embodiment of the first aspect.

In FIG. 1, an embodiment of the computer-implemented method of indicating machine failures according to the first aspect is schematically depicted. The computer-implemented method includes the acts of receiving 1, transforming 2, and predicting 3, as well as the optional act of initiating 8. The computer-implemented method further includes the acts of storing 9 and deriving 10.

First, input signals 4 including a temperature signal T, a vibration signal f, a rotational speed signal v, and a torque signal F are received 1 in the act of receiving 1. The input signals 4 are generated by corresponding sensors of a rotating machine monitoring a motor of the rotating machine.

In the act of transforming 2, the input signals 4 are transformed 2 into features 5. Some of the input signals are transformed into spectrums 5.1, namely the vibration signal f is transformed into a frequency spectrum in the frequency domain. The rotational speed signal v is transformed into a velocity spectrum in the velocity domain. Further, from the transformed spectrums 5.1 or the input signals 4 statistical features 5.2 are derived like RMS, significance, variance etc.

The features 5 are provided to a neural network 12, which is predicting a class (e.g., failure type) 7.1 and a severity 7.2 of the machine failure 7 in the act of predicting 3. The neural network has been trained with sets of training features labelled with respective classes and severities of machine failures present during generation of the underlying input signals.

Optionally, the class 7.1 and/or severity 7.2 of the predicted machine failure 7 is used for automatically initiating 8 counter measures like repositioning of movable parts of the machine, refilling of coolant or lubricant etc.

Further, in the act of storing 9, the features 5, and optionally the class 7.1 and/or severity 7.2 of the predicted machine failure 7 of the motor are stored over time as historical data of the motor. In other words, the history (e.g., historical data of machine failures) of the motor is stored.

In the act of deriving 10, a remaining lifetime of the motor based on the historical data of the motor is derived. Based on the history (e.g., classes/severities of machine failures over time) or information derived therefrom, like incidence of machine failures, the remaining lifetime of the motor is derived. Further, an audit trail for the motor may be generated based on the history.

Figure 2:
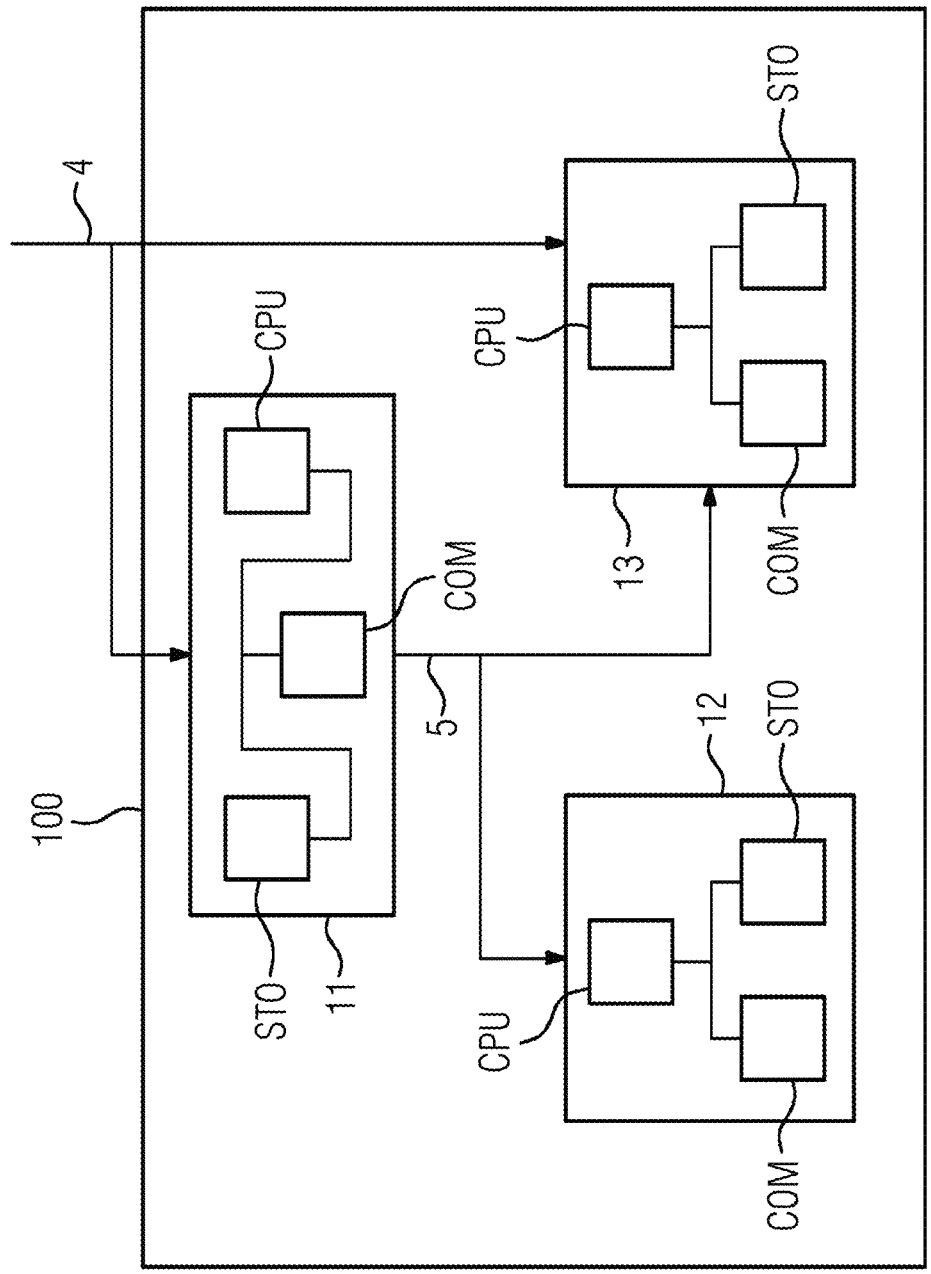
FIG. 2 depicts a schematic view of the data processing system for indicating machine failures according to an embodiment of the second aspect.

In FIG. 2, a data processing system 100 for indicating machine failures according to an embodiment of the second aspect is schematically depicted. The data processing system 100 is in particular arranged and configured to execute the computer-implemented method of FIG. 1. Thereto, the data processing system 100 includes a system 11 for transforming, a neural network 12 for making predictions, and a system 13, in particular for storing predictions. Each of the systems/entities 11, 12, and 13 may include a central processing unit (CPU) for executing the respective acts of the method of FIG. 1, a communication unit (COM) for receiving and/or transmitting data, and a storage unit (STO).

The input signals 4 are received by the system 11. The system 11 transforms the input signals 4 into the features 5. The features 5 are transmitted to the neural network 12, which predicts the class 7.1 and the severity 7.2 of machine failures 7 based on the features 5. The input signals 4 and the classes 7.1 and the severities 7.2 of predicted machine failures 7 are transmitted to the system 13, where these are stored. Based on the stored input signals 4 and the classes 7.1 and the severities 7.2 of predicted machine failures 7 the remaining lifetime of the motor is derived.

Figure 3:
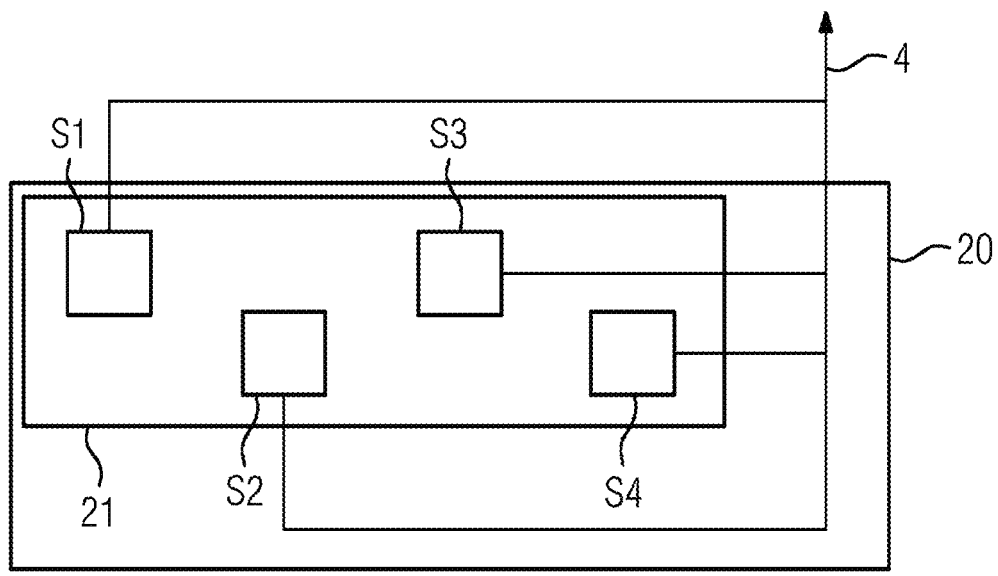
FIG. 3 depicts a schematic view of the machine according to an embodiment of the fourth aspect.

In FIG. 3, the rotating machine 20 is schematically depicted. The rotating machine 20 includes a motor 21 as well as a temperature sensor S1 for monitoring the temperature of the motor 21, a vibration sensor S2 for monitoring the vibrations of the motor 21, a velocity sensor S3 for monitoring the rotational speed of the motor 21, and a torque sensor S4 for monitoring the torque of the motor 21. The monitored physical quantities, temperature, vibrations, rotational speed, and torque are transmitted as input signals 4 to the data processing system 100 of FIG. 2.

Figure 4:
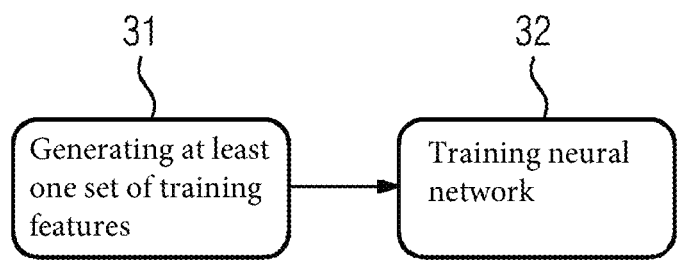
FIG. 4 depicts a schematic flow-chart of the computer-implemented method of training a neural network for indicating machine failures according to an embodiment of the fifth aspect.

In FIG. 4, the computer-implemented method of training a neural network for indicating machine failures is schematically depicted. The computer-implemented method includes the acts of generating 31 and training 32.

In the act of generating 31, at least one set of training features is generated. The training input signals correspond to the input signals 4 and the training features correspond to the features 5 used in the method of indicating machine failures of FIG. 1. The training features are derived from corresponding training input signals of a motor. Specific patterns of the training features or combinations of patterns of the training features are indicative of specific machine failures, in particular of specific rotating machine failures.

The training input signals are labelled with known classes and known severities of respective machine failures. The neural network used for predicting the machine failures of the motor needs to learn cues in patterns of provided features 5. Therefore, the set of the training features contains features of training input signals generated during a certain machine failure of the respective machine part (or of a comparable machine part). The set of the training features is labelled with the respective machine failure(s), in particular with the class and/or the severity of the machine failure, of the machine part present while the corresponding training input signals were generated (e.g., by the respective sensors).

In the act of training 32, the neural network is trained using the at least one set of training features.

Although specific embodiments have been illustrated and described herein, it will be appreciated by those of ordinary skill in the art that a variety of alternate and/or equivalent implementations exist. It should be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents. This application may cover any adaptations or variations of the specific embodiments discussed herein.

In the foregoing detailed description, various features are grouped together in one or more examples for the purpose of streamlining the disclosure. It is understood that the above description is intended to be illustrative, and not restrictive. It is intended to cover all alternatives, modifications and equivalents as may be included within the scope of the disclosure. Many other examples will be apparent to one skilled in the art upon reviewing the above specification.

Specific nomenclature used in the foregoing specification is used to provide a thorough understanding of the disclosure. However, it will be apparent to one skilled in the art in light of the specification provided herein that the specific details are not required in order to practice the disclosure. Thus, the foregoing descriptions of specific embodiments are presented for purposes of illustration and description. They are not intended to be exhaustive or to limit the disclosure to the precise forms disclosed; obviously many modifications and variations are possible in view of the above teachings.

The embodiments were chosen and described in order to best explain the principles of the disclosure and its practical applications, to thereby enable others skilled in the art to best utilize the disclosure and various embodiments with various modifications as are suited to the particular use contemplated. Throughout the specification, the terms "including" and "in which" are used as the plain-English equivalents of the respective terms "comprising" and "wherein," respectively. Moreover, the terms "first," "second," and "third," etc., are used merely as labels, and are not intended to impose numerical requirements on or to establish a certain ranking of importance of their objects. In the context of the present description and claims the conjunction "or" is to be understood as including ("and/or") and not exclusive ("either . . . or").

The invention claimed is:

1. A computer-implemented method of indicating machine failures, the method comprising:
   receiving at least one input signal based on at least one physical quantity of at least one machine part of a machine, monitored by at least one sensor;
   transforming the at least one input signal into at least one feature having a different domain and/or a different reference value than the at least one input signal, wherein the at least one input signal is transformed into a spectrum of the at least one input signal and into stochastic features for predominant parts of the spectrum; and
   predicting a class and/or a severity of at least one machine failure based on the at least one feature by a neural network trained on specific patterns of the at least one feature or combinations of patterns of more than one feature indicative of specific machine failures.

2. The computer-implemented method of claim 1, wherein the at least one physical quantity is a vibration of the at least one machine part, and
   wherein the at least one input signal is a vibration signal.

3. The computer-implemented method of claim 1, wherein the at least one machine part is a motor.

4. The computer-implemented method of claim 1, wherein the neural network is a deep neural network.

5. The computer-implemented method of claim 1, wherein the neural network is deployed in a cloud system or on a local computer infrastructure of a premise where the machine is located.

6. The computer-implemented method of claim 1, further comprising:
   storing the at least one feature of respective machine failures of the at least one machine part over time as historical data of the at least one machine part; and
   deriving a remaining lifetime of the at least one machine part based on the historical data of the at least one machine part.

7. The computer-implemented method of claim 6, further comprising:
   storing the class and/or the severity of the respective machine failures of the at least one machine part over time as the historical data of the at least one machine part.

8. The computer-implemented method of claim 1, wherein the machine is a rotating machine.

9. The computer-implemented method of claim 1, wherein the at least one input signal is additionally transformed into stochastic moments and/or energies for the predominant parts of the spectrum.

10. The computer-implemented method of claim 9, wherein the stochastic moments and/or energies comprise stochastic moments and/or energies for bands around harmonic frequencies of a vibration signal.

11. A data processing system for indicating machine failures, the data processing system comprising:
   a first system having at least one communication unit configured to receive at least one input signal based on at least one physical quantity of at least one machine part of a machine, monitored by at least one sensor;
   a second system having at least one processor configured to transform the at least one input signal into at least one feature having a different domain and/or a different reference value than the at least one input signal, wherein the at least one input signal is transformed into a spectrum of the at least one input signal and into stochastic features for predominant parts of the spectrum; and
   a neural network configured to predict a class and/or a severity of at least one machine failure based on the at least one feature, wherein the neural network is trained on specific patterns of the at least one feature or combinations of patterns of more than one feature indicative of specific machine failures.

12. A machine comprising:
   at least one machine part; and
   at least one sensor configured to generate at least one input signal by monitoring at least one physical quantity of the at least one machine part,
   wherein the at least one input signal is provided to a data processing system configured to:
       transform the at least one input signal into at least one feature having a different domain and/or a different reference value than the at least one input signal, wherein the at least one input signal is transformed into a spectrum of the at least one input signal and into stochastic features for predominant parts of the spectrum; and predict, by a neural network of the data processing system, a class and/or a severity of at least one machine failure based on the at least one feature, wherein the neural network is trained on specific patterns of the at least one feature or combinations of patterns of more than one feature indicative of specific machine failures.

13. The machine of claim 12, wherein the at least one sensor is a vibration sensor configured to generate a vibration signal by monitoring a vibration of the at least one machine part.

14. The machine of claim 12, wherein the at least one machine part is a motor.

15. The machine of claim 12, wherein the machine is a rotating machine.

16. A computer-implemented method of training a neural network for indicating machine failures, the method comprising:

generating at least one set of at least one training feature derived from at least one training input signal based on at least one physical quantity of at least one machine part of a machine, wherein the at least one training input signal has been transformed into the at least one training feature comprising a spectrum of the at least one input signal and stochastic features for predominant parts of the spectrum, wherein specific patterns of the at least one training feature or combinations of patterns of more than one training feature are indicative of specific machine failures, and wherein the at least one training input signal is labelled with known classes and known severities of respective machine failures; and training the neural network using the at least one set of the at least one training feature.

17. The computer-implemented method of claim 16, wherein the at least one training input signal is a real input signal from a real machine, a simulated signal from an artificial model of the machine, or a combination thereof.

18. The computer-implemented method of claim 16, wherein the neural network is a pre-trained neural network.

19. The computer-implemented method of claim 16, wherein the machine is a rotating machine.

* * * * *